US009597962B2

(12) United States Patent
Tanaka et al.

(10) Patent No.: US 9,597,962 B2
(45) Date of Patent: Mar. 21, 2017

(54) DISPLAY CONTROL DEVICE AND DISPLAY CONTROL PROGRAM

(71) Applicant: Panasonic Intellectual Property Management Co., Ltd., Osaka (JP)

(72) Inventors: Tsuyoshi Tanaka, Kyoto (JP); Tomokazu Imaizumi, Kanagawa (JP); Tadashi Shibata, Osaka (JP); Takashi Toda, Kanagawa (JP); Takahiro Kuroda, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/767,306

(22) PCT Filed: Feb. 21, 2014

(86) PCT No.: PCT/JP2014/000892
§ 371 (c)(1),
(2) Date: Aug. 12, 2015

(87) PCT Pub. No.: WO2014/129197
PCT Pub. Date: Aug. 28, 2014

(65) Prior Publication Data
US 2015/0375620 A1 Dec. 31, 2015

(30) Foreign Application Priority Data

Feb. 22, 2013 (JP) ................................ 2013-033270

(51) Int. Cl.
*B60K 35/00* (2006.01)
*B60K 37/02* (2006.01)

(52) U.S. Cl.
CPC .............. *B60K 35/00* (2013.01); *B60K 37/02* (2013.01); *B60K 2350/106* (2013.01);
(Continued)

(58) Field of Classification Search
CPC . B60K 37/02; B60K 2350/02; B60K 2350/00
(Continued)

(56) References Cited

U.S. PATENT DOCUMENTS

2009/0102632 A1* 4/2009 Kobayashi ............. B60K 35/00
340/438
2013/0229417 A1* 9/2013 Brenner ................. B60K 37/02
345/440

FOREIGN PATENT DOCUMENTS

JP 11-311545 11/1999
JP 2004-136823 5/2004
(Continued)

OTHER PUBLICATIONS

International Search Report of PCT application No. PCT/JP2014/000892 dated Mar. 25, 2014.

*Primary Examiner* — Kevin Kim
(74) *Attorney, Agent, or Firm* — Wenderoth, Lind & Ponack, L.L.P.

(57) ABSTRACT

A display control device of the present invention is a device that controls an indication status of a display device disposed in front of a driver's seat of a vehicle, and includes a traveling status obtaining unit that obtains a traveling status of the vehicle, which includes at least a speed of the vehicle; a traveling status determining unit that determines, based on the traveling status, whether or not a predetermined condition is satisfied, the predetermined condition corresponding to at least a condition that both of a first region to be displayed on the display device and a second region other than the first region are present on an analog speed meter that presents the speed; and a display control unit that displays the first region of the analog speed meter on the display device, and does not display the second region of the
(Continued)

analog speed meter on the display device when the predetermined condition is satisfied.

9 Claims, 7 Drawing Sheets

(52) U.S. Cl.
CPC ............... *B60K 2350/1064* (2013.01); *B60K 2350/1072* (2013.01); *B60K 2350/1096* (2013.01)

(58) Field of Classification Search
USPC .................................................. 340/441, 466
See application file for complete search history.

(56) References Cited

FOREIGN PATENT DOCUMENTS

| | | | | |
|---|---|---|---|---|
| JP | 2004-182092 | | 7/2004 | |
| JP | 2006-327481 | | 12/2006 | |
| JP | 2007-159036 | | 6/2007 | |
| JP | 2010-234877 | | 10/2010 | |
| WO | WO2012/059162 | * | 3/2012 | ............. B60K 37/02 |

* cited by examiner

DISPLAY CONTROL DEVICE AND DISPLAY CONTROL PROGRAM

THIS APPLICATION IS A U.S. NATIONAL PHASE APPLICATION OF PCT INTERNATIONAL APPLICATION PCT/JP2014/000892.

TECHNICAL FIELD

The present invention relates to a display control device that controls an indication status of a display device disposed in front of a driver's seat of a vehicle, and to a display control program for use in this display control device.

BACKGROUND ART

In recent years, with regard to a driving instrument display board (meter panel) disposed in front of a driver's seat of a vehicle, an image display device (hereinafter, simply referred to as a "display device") such as a liquid crystal display has been being substituted for conventional mechanical instruments.

The meter panel of such a display device as described above can easily change design and display content. Accordingly, a technology for displaying, on the meter panel, a variety of information (hereinafter, referred to as "additional information") such as weather information, which is other than information presented by the conventional instruments, is described, for example, in PTL 1.

In response to whether or not the vehicle is stopped, and so on, the technology described in PTL 1 displays the additional information on a space ensured by reducing/moving a tachometer, or superimposes and displays the additional information on a speed meter and the tachometer. Such a conventional technology as described above can display the additional information in addition to the conventional instruments, and can enhance convenience of the vehicle.

However, the conventional technology has limitations on enhancing the convenience by presenting the additional information while sufficiently enhancing driving safety. This is because, even if the tachometer is reduced/moved, such a space that can be ensured is no more than a region occupied originally by the tachometer, and a wider display region cannot be ensured in order to display the additional information. Moreover, when the additional information is superimposed and displayed on the speed meter, it becomes difficult to grasp a speed of the vehicle.

The present invention provides a display control device and a display control program capable of achieving both the ensuring of the driving safety and the enhancement of the convenience which is made by the presentation of the additional information.

CITATION LIST

Patent Literature

PTL 1: Unexamined Japanese Patent Publication No. H11-311545

SUMMARY OF THE INVENTION

A display control device of the present invention is a display control device that controls an indication status of a display device disposed in front of a driver's seat of a vehicle, the display control device including: a traveling status obtaining unit that obtains a traveling status of the vehicle, which includes at least a speed of the vehicle; a traveling status determining unit that determines, based on the traveling status, whether or not a predetermined condition is satisfied, the predetermined condition corresponding to at least a condition that both of a first region to be displayed on the display device and a second region other than the first region are present on an analog speed meter that presents the speed; and a display control unit that, when the traveling status shifts to another status that satisfies the predetermined condition of the analog speed meter, controls the indication status to move a display position of the analog speed meter in a display region of the display device from an initial position in which an entire region of the analog speed meter is included in the display region to an end position in which the second re ion lies outside the display region and not to substantially change a size, shape and orientation of the first region.

A display control program of the present invention is a display control program for use in a display control device that controls an indication status of a display device disposed in front of a driver's seat of a vehicle, the display control program causing a computer of the display control device to execute processing of: obtaining a traveling status of the vehicle, which includes at least a speed of the vehicle; determining, based on the traveling status, whether or not a predetermined condition is satisfied, the predetermined condition corresponding to at least a condition that both of a first region to be displayed on the display device and a second region other than the first region are present on an analog speed meter that presents the speed; and when the traveling status shifts to another status that satisfies the predetermined condition of the analog speed meter, controlling the indication status to move a display position of the analog speed meter in a display region of the display device from an initial position in which an entire region of the analog speed meter is included in the display region to an end position in which the second region lies outside the display region and not to substantially change a size, shape and orientation of the first region.

With the above-described configuration, the present invention can achieve both of the ensuring of the driving safety and the enhancement of the convenience which is made by the presentation of the additional information.

DESCRIPTION OF EMBODIMENTS

A description is made below in detail of an exemplary embodiment of the present invention with reference to the drawings.

First, a description is made of an outline of an environment where a display control device according to this exemplary embodiment is used.

Figure 1:
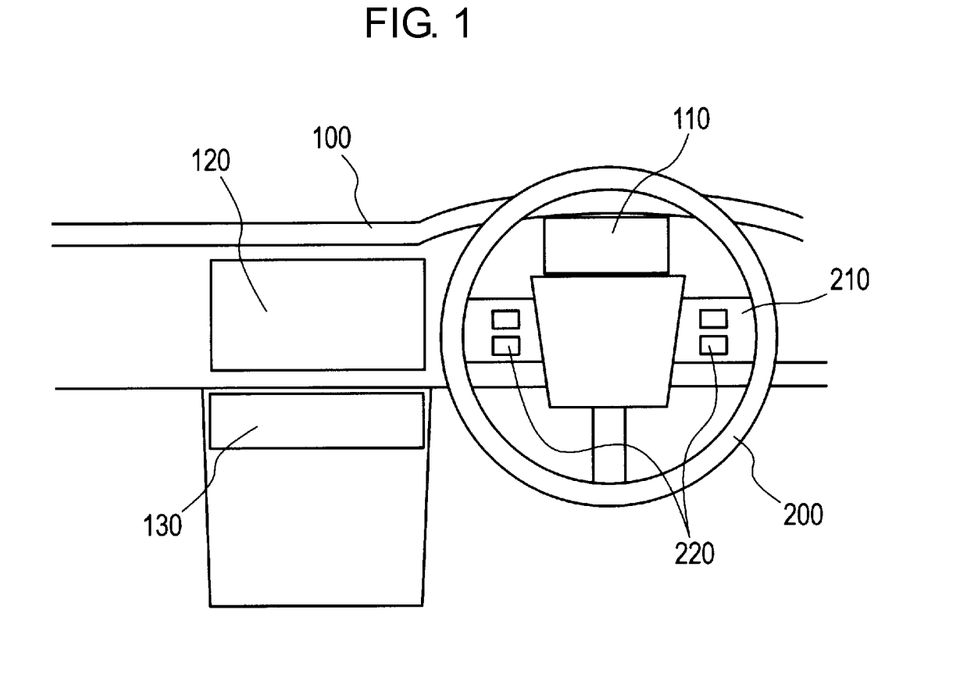
FIG. 1 is a view showing an outline of a portion in front of a driver's seat of a vehicle, on which a display control device according to an exemplary embodiment of the present invention is mounted.

FIG. 1 is a view showing an outline of a portion in front of a driver's seat of a vehicle on which the display control device according to this exemplary embodiment is mounted.

As shown in FIG. 1, in front of the driver's seat of the vehicle on which the display control device (not shown) according to this exemplary embodiment is mounted, the following are provided: an instrument panel 100; and a steering wheel 200 in which a rotation shaft is fixed to the instrument panel 100.

On the instrument panel 100, the following are provided: a display device (meter panel) 110; a multimedia device 120; and an air conditioner device 130.

The display device 110 is disposed on the back of the steering wheel 200. The multimedia device 120 and the air conditioner device 130 are disposed on the left side of steering wheel 200 (that is, on the center of the vehicle).

On a spoke portion 210 of the steering wheel 200, a steering switch unit 220 composed of a plurality of key switches is provided.

Note that the display control device (not shown) according to this exemplary embodiment is disposed, for example, inside the instrument panel 100.

The display device 110 is, for example, a liquid crystal display, and displays instruments such as a speed meter.

The multimedia device 120 receives audio data from a radio wave, CD (Compact Disk), a music player and the like, and outputs an audio from a speaker (not shown) mounted on the vehicle.

The air conditioner device 130 performs ventilation, heating and cooling for the inside of the vehicle.

The steering switch unit 220 is a user interface composed, for example, of a plurality of key switches, and receives operations for the display control device from a driver.

Note that the display control device controls operations of the display device 110, multimedia device 120 and air conditioner device 130 in accordance with the operations performed in steering switch unit 220. Moreover, on the display device 110, the display control device appropriately displays an operation menu for assisting the operations for the display device 110, multimedia device 120 and air conditioner device 130, the operations being issued via the steering switch unit 220.

That is to say, while confirming the operation menu displayed appropriately on the display device 110, a user operates the steering switch unit 220, to operate the display device 110, multimedia device 120, and air conditioner device 130.

Moreover, the display control device according to this exemplary embodiment displays not only the instruments but also additional information on the display device 110.

Note that, here, the "instruments" are instruments included in a conventional mechanical interest packet, and include at least an analog speed meter (speed meter), shift position marks, an odometer, and a fuel gauge. Moreover, the "instruments" include, for example, a tachometer (revolution counter).

The "analog speed meter" is an instrument that presents the speed of the vehicle by values of speeds displayed annularly and by a position of an indicator that operates rotationally.

The "additional information" is information other than the instruments. A specific example of the additional information will be described later.

Next, a configuration of the display control device according to this exemplary embodiment is described.

Figure 2:
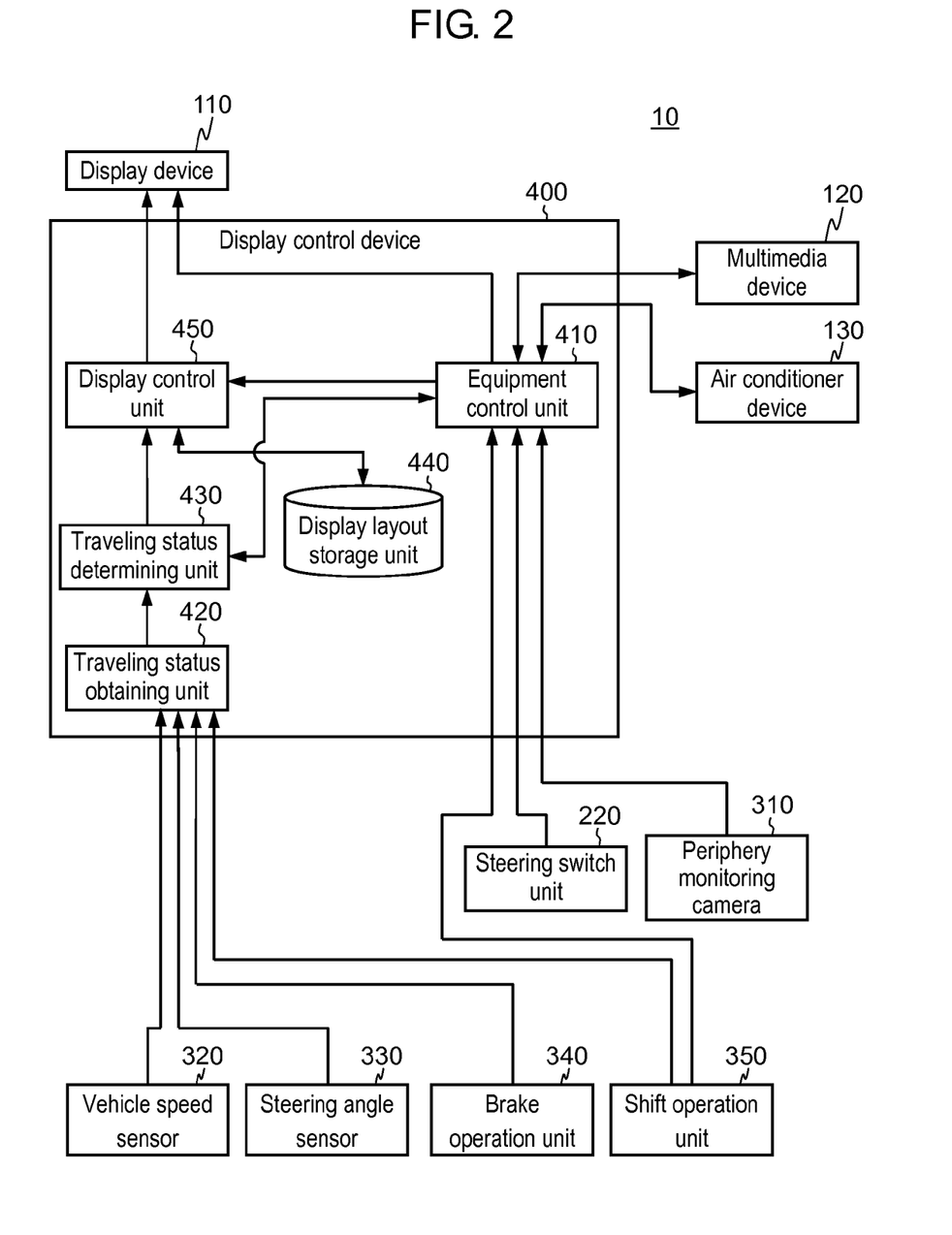
FIG. 2 is a block diagram showing a configuration of a vehicle equipment control system including the display control device according to this exemplary embodiment.

FIG. 2 is a block diagram showing a configuration of a vehicle equipment control system including the display control device according to this exemplary embodiment.

In the vehicle equipment control system 10 shown in FIG. 2, the display control device 400 is connected to the steering switch unit 220, a periphery monitoring camera 310, a vehicle speed sensor 320, a steering angle sensor 330, a brake operation unit 340, and a shift operation unit 350 (hereinafter, generically referred to as "automotive sensors" as appropriate). Moreover, the display control device 400 is connected to the multimedia device 120, air conditioner device 130 and display device 110 (hereinafter, generically referred to as "automotive equipment" as appropriate). For example, this connection is realized by using an automotive LAN such as a CAN (Controller Area Network) and a LIN (Local Interconnect Network).

The steering switch unit 220 is the steering switch unit 220 shown in FIG. 1, and each time when it is operated, it outputs an operation signal, which indicates the content of such an operation, to the display control device 400.

The periphery monitoring camera 310, for example, is a digital video camera mounted at the rear of the vehicle, takes a video of an area behind the vehicle, and outputs a video signal to the display control device 400.

The vehicle speed sensor 320 is, for example, provided on a transmission of the vehicle, detects the speed of the vehicle, and outputs a speed signal, which indicates the detected speed, to the display control device 400.

The steering angle sensor 330, for example, is provided on the shaft of the steering wheel, detects a steering angle of the vehicle, and outputs a steering angle signal, which indicates the detected steering angle, to the display control device 400.

The brake operation unit 340 receives a brake operation for the vehicle from a driver, and each time when the brake operation is performed, outputs a brake signal, which indicates that the brake operation is performed, to display control device 400.

The shift operation unit 350 receives an operation of switching a shift position of the vehicle from a driver, and each time when the switching operation is performed, outputs a shift position signal, which indicates a switched shift position, to the display control device 400 and an equipment control unit 410.

The multimedia device 120 is the multimedia device 120 shown in FIG. 1, and outputs a status signal, which indicates an operation status thereof, to display control device 400. Moreover, an operation of the multimedia device 120 is controlled by a control signal, which is input from the display control device 400 and will be described later.

The air conditioner device 130 is the air conditioner device 130 shown in FIG. 1, and outputs a status signal, which indicates an operation status thereof, to the display control device 400. Moreover, an operation of the air conditioner device 130 is controlled by a control signal, which is input from the display control device 400 and will be described later.

The display device 110 is the display device 110 shown in FIG. 1, converts an image signal, which is input from the display control device 400 and will be described later, into an image, and displays the image.

The display control device 400 includes: the equipment control unit 410; a traveling status obtaining unit 420; a traveling status determining unit 430; a display layout storage unit 440; and a display control unit 450.

The equipment control unit 410 receives the shift position signal from the shift operation unit 350, the operation signal from the steering switch unit 220, the video signal from the periphery monitoring camera 310, the status signal from the multimedia device 120, and the status signal from the air conditioner device 130. Then, the equipment control unit 410 determines whether or not the additional information to be highlighted on the display device 110 is present based on the signals input thereto. Then, when the information concerned (hereinafter, referred to as "highlight-requiring information") is present, the equipment control unit 410 outputs the highlight-requiring information to the display control unit 450. The highlight-requiring information is, for example, the video of the area behind the vehicle, or the operation menu of the automotive equipment.

Moreover, when the highlight-requiring information is present, the equipment control unit 410 issues a notice on this effect to the traveling status determining unit 430.

Moreover, in response to the operation signal from the steering switch unit 220, the equipment control unit 410 generates a control signal for controlling each of the display device 110, multimedia device 120 and air conditioner device 130. Then, the equipment control unit 410 outputs the generated control signals to the display device 110, multimedia device 120, or air conditioner device 130

The traveling status obtaining unit 420 obtains a traveling status of the vehicle, which includes at least the speed of the vehicle. More specifically, the traveling status obtaining unit 420 receives the speed signal from the vehicle speed sensor 320, the steering angle signal from the steering angle sensor 330, the brake signal from the brake operation unit 340, and the shift position signal from the shift operation unit 350. Then, the traveling status obtaining unit 420 outputs the respective input signals (information) to the traveling status determining unit 430 in a subsequent stage. Note that the traveling status obtaining unit 420 may convert the respective input signals (information) into formats of information that is interpretable by the traveling status determining unit 430 (speed, steering angle, presence of braking, and shift position), and thereafter, may output the converted information to the traveling status determining unit 430.

The traveling status determining unit 430 determines whether or not a predetermined condition is satisfied based on at least one of the speed, the steering angle, the presence of braking, and the shift position (that is, the traveling status of the vehicle), which is input from the traveling status obtaining unit 420.

Here, the predetermined condition corresponds to at least a condition that both of a region to be displayed on the display device 110 (hereinafter referred to as a "display-requiring region") and a region other than the display-requiring region (hereinafter referred to as a "display non-requiring region") are present on the analog speed meter. The "display-requiring region" in this exemplary embodiment corresponds to the "first region" of the present invention, and the "display non-requiring region" in this exemplary embodiment corresponds to the "second region" of the present invention.

In this exemplary embodiment, the display-requiring region corresponds to a low-speed range on the analog speed meter when the speed is low, and the display non-requiring region corresponds to a high-speed range on the analog speed meter. Moreover, a boundary between such a high speed and such a low speed and a boundary between the display-requiring region and the display non-requiring region (that is, a regional area ratio between the display-requiring region and the display non-requiring region) are decided by a design specification, and do not limit the disclosure range of this application.

Moreover, the above-described predetermined condition further corresponds to at least a condition that the highlight-requiring information is present in information (hereinafter, referred to as "display object information") to be displayed in a region, on which the analog speed meter is not displayed, of the display region in addition to the above-described principal condition. The traveling status determining unit 430 performs this determination, for example, based on whether or not a notice from the equipment control unit 410 is present.

Then, based on whether or not the above-described predetermined condition is satisfied, the traveling status determining unit 430 selects a display mode from a plurality of predefined display modes to be described later, and instructs the display control unit 450 on an operation in the selected display mode.

The display layout storage unit 440 prestores a display layout of the information on the display device 110 for each of the plurality of display modes. Note that, here, the display mode is a mode for switching the display layout of the display device 110. The display layout is a combination of locations, sizes and ranges of the respective pieces of the information on an entirety of a display screen, a way of presenting the respective pieces of the information, and the like. In this exemplary embodiment, the plurality of display modes includes an initial display mode, a speed meter half-display mode, and a tachometer non-display mode.

The initial display mode is a display mode of displaying an entire region of the analog speed meter and the instruments, and of not displaying the additional information.

The speed meter half-display mode is a display mode of displaying only the display-requiring region (first region) of the analog speed meter, and of displaying the additional information by using a free region created as a result that the display non-requiring region (second region) becomes non-displayed.

The tachometer non-display mode is a display mode of displaying the entire region of the analog speed meter and displaying the instruments excluding the tachometer, and of displaying the additional information in a free region made available as a result that the tachometer becomes non-displayed. Specific examples of the display layouts of the respective display modes will be described later.

Note that, in this exemplary embodiment, even if the display mode is changed, the size, shape and orientation of the analog speed meter are hardly changed, and the range on which the analog speed meter is displayed is only changed. Moreover, it is possible to refer to the display layouts, which are stored in the display layout storage unit 440, from the display control unit 450.

When the above-described predetermined condition is not satisfied, the display control unit 450 is instructed from the traveling status determining unit 430 to perform an operation in the initial display mode or the tachometer non-display mode. Then, the display control unit 450 generates an image signal of an image that forms the display layout of the initial display mode or the tachometer non-display mode, and outputs the generated image signal to the display device 110. That is to say, the display control unit 450 displays the entire region of the analog speed meter on the display device 110.

Moreover, when the above-described predetermined condition is satisfied, the display control unit 450 is instructed from the traveling status determining unit 430 to perform an operation in the speed meter half-display mode. Then, the display control unit 450 generates an image signal of an image that forms the display layout of the speed meter half-display mode, and outputs the generated image signal to the display device 110. That is to say, the display control unit 450 displays only the display-requiring region of the analog speed meter on the display device 110.

In this exemplary embodiment, when the speed is low, then as mentioned above, the display-requiring region corresponds to the low-speed range, and the display non-requiring region corresponds to the high-speed range. Hence, when the speed is low, the display control unit 450 allows the analog speed meter to display only the low-speed range, and not to display the high-speed range.

Moreover, though not shown, the display control device 400 includes a CPU (central processing unit), and a storage medium such as a ROM (read only memory) that stores a control program. Furthermore, the display control device 400 includes a working memory such as a RAM (random access memory), and a communication circuit. In this case, functions of the above-described respective units are realized in such a manner that the CPU executes the control program.

The display control device 400 having such a configuration can prevent the region of the analog speed meter, the region corresponding to the high-speed range, from being displayed when the speed of the vehicle is low.

In general, the analog speed meter is the most important as a display object. However, in a case where the speed of the vehicle is low, for example, at a time when the vehicle is being parked, the region of the analog speed meter, which corresponds to the high-speed range, is less important for the driver. That is to say, even if the region corresponding to the high-speed range is not displayed, for example, at the time when the vehicle is being parked, a possibility that driving safety may be impaired is low. On the other hand, if the display region of the analog speed meter is reduced, then it becomes possible to ensure such a space, which is usable for displaying the additional information, more widely than in a case of reducing/moving the tachometer, and convenience for a driver or a fellow passenger is enhanced. Hence, the display control device 400 can achieve both the ensuring of the driving safety and enhancement of the convenience which is made by the presentation of the additional information.

Here, the specific examples of the display layouts of the respective display modes are described.

Figure 3:
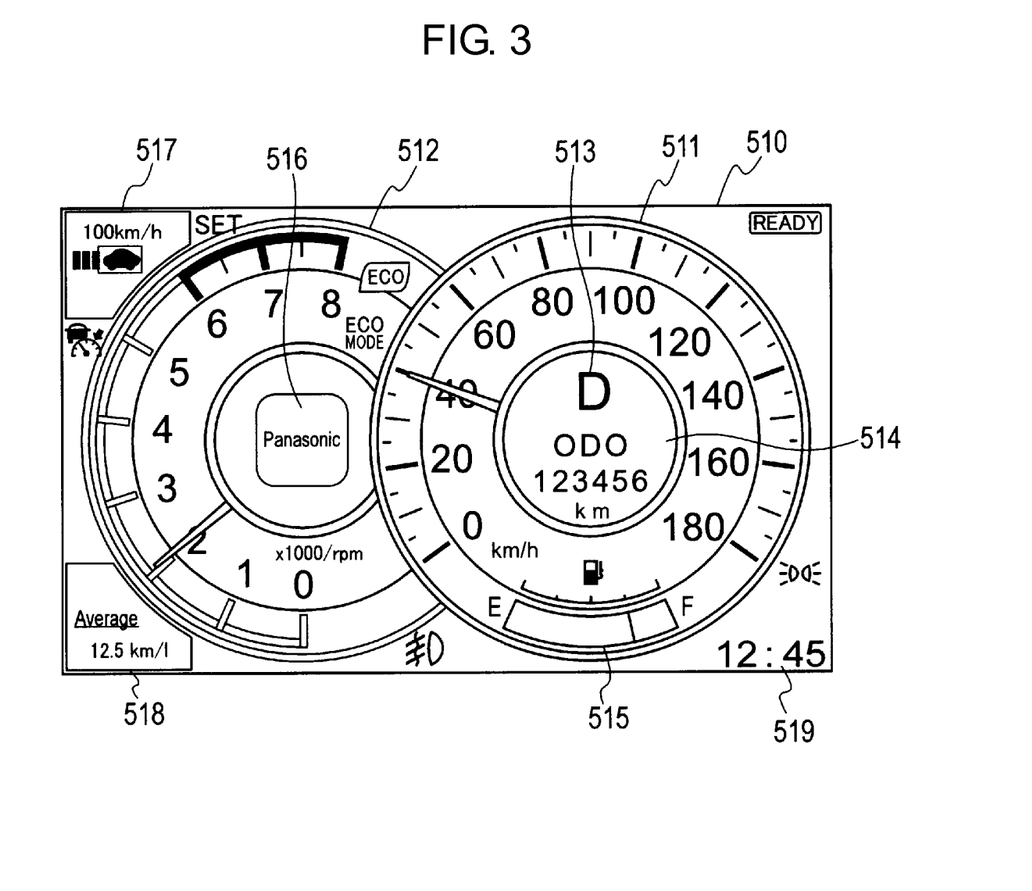
FIG. 3 is a view showing an example of an initial-display mode display screen of the display control device according to this exemplary embodiment.

FIG. 3 is a view showing an example of the display screen of the display device 110 in the initial display mode.

As shown in FIG. 3, in a display screen 510 in the initial display mode, a speed meter 511 that is a pointer-type analog speed meter is disposed on a center right side, and a tachometer 512 that displays a rotational speed is disposed on a center left side. On a center portion of the speed meter 511, an odometer 514 that displays a shift position 513 and a travel distance is disposed, and on a lower portion of the speed meter 511, a fuel gauge 515 is disposed. On a center portion of tachometer 512, an automotive instrument status 516 is disposed.

Moreover, in the display screen 510 in the initial display mode, a traveling assistance system status 517 is disposed on an upper left corner portion, a fuel consumption information 518 is disposed on a lower left corner portion, and a timepiece 519 is disposed on a lower right corner portion thereof.

That is to say, in the display screen 510 in the initial display mode, the information indicating the traveling status of the vehicle is displayed in a similar way to the conventional meter panel, and particularly, the entire region (0 km/h to 180 km/h clockwise) of the speed meter 511 is displayed.

Note that, though details will be described later, the display control device 400 shown in FIG. 2 generates and displays the image in the display layout of the display screen 510 in the initial display mode at a starting time (start-up time of the vehicle), while the highlight-requiring information is not present, and in a case where the vehicle is traveling along a sharp curve.

Figure 4:
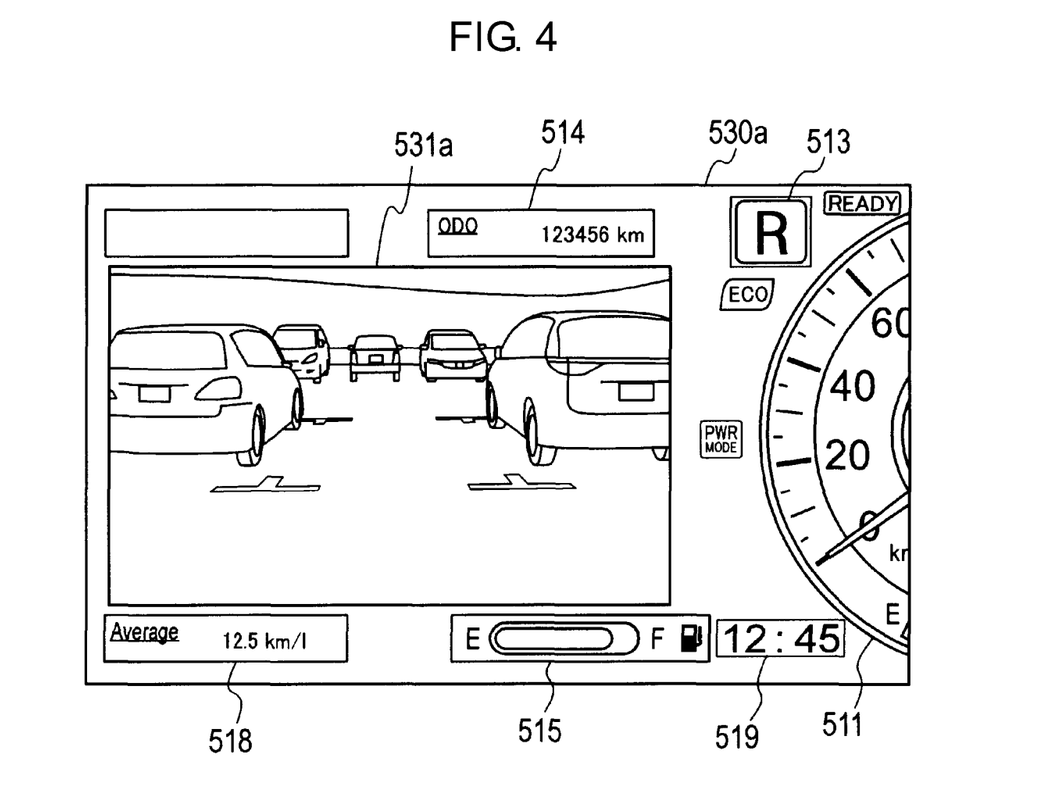
FIG. 4 is a view showing a first example of a half-display mode display screen of an analog speed meter of the display control device according to this exemplary embodiment.
Figure 5:
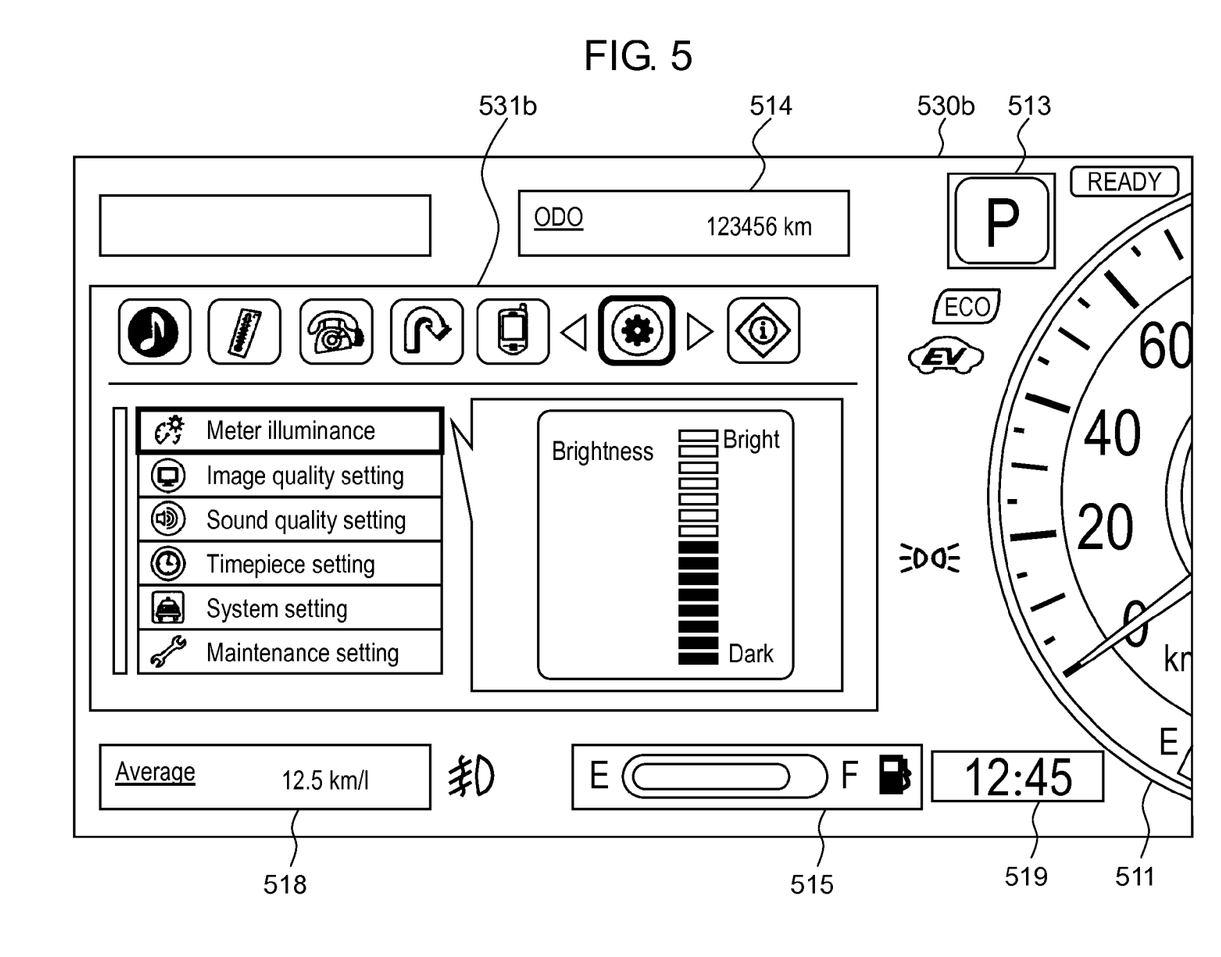
FIG. 5 is a view showing a second example of the half-display mode display screen of the speed meter of the display control device according to this exemplary embodiment.

FIG. 4 and FIG. 5 are views showing examples of the display screen of the display device 110 in the speed meter half-display mode.

As shown in FIG. 4 and FIG. 5, in display screens 530*a* and 530*b* in the speed meter half-display mode, the speed meter 511 is located on right-side end portions of display screens 530*a* and 530*b* in a form of being extending outward from display screens 530*a* and 530*b*. More specifically, of the entire region of the speed meter 511, the region which corresponds to the low-speed range (0 km/h to approximately 70 km/h), which is a little less than the left half thereof, is displayed, while the region which corresponds to the high-speed range (approximately 70 km/h to 180 km/h), which is a little more than the right half thereof, is not displayed. Then, the odometer 514 and shift position 513 are located on upper end portions of the display screens 530*a* and 530*b*, and the fuel gauge 515, fuel consumption information 518 and timepiece 519 are located on lower end portions of the display screens 530*a* and 530*b*.

Moreover, the tachometer 512, automotive instrument status 516 and traveling assistance system status 517, which have been displayed on the display screen 510 in the initial display mode shown in FIG. 3, are not displayed on the display screens 530*a* and 530*b*. Then, such pieces of highlight-requiring information 531*a* and 531*b* are displayed largely on a space, which is made from the center to the left end portion as a result that these pieces of information have disappeared and that the speed meter 511 further is made to be extending outward to the right end portion. FIG. 4 shows a case where highlight-requiring information 531*a* is a video of an area behind the vehicle taken by the periphery monitoring camera 310. Moreover, FIG. 5 shows a case where the highlight-requiring information 531*b* is an operation menu (detailed version) of the automotive equipment.

That is to say, on the display screens 530*a* and 530*b* in the speed meter half-display mode, the traveling status of the vehicle is displayed while narrowing content thereof to things that are necessary, and particularly, the region of the speed meter 511, which corresponds to the high-speed range, becomes non-displayed, and the pieces of highlight-requiring information 531*a* and 531*b* are displayed largely. Moreover, the respective pieces of the displayed information maintain status close to those of the display layout of the display screen 510 in the initial display mode as much as possible. In such a way, while maintaining the display of the region of the speed meter 511, which corresponds to the low-speed range, and of other essential information in an easily visually recognizable form, display control device 400 can display the highlight-requiring information 531*a* and 531*b* largely.

Note that, though details will be described later, in a case where the pieces of highlight-requiring information 531*a* and 531*b* are present and the vehicle is traveling a substantially straight line at a low speed, the display control device 400 generates and displays images in the display layouts of the display screens 530*a* and 530*b* in the speed meter half-display mode as described above.

Figure 6:
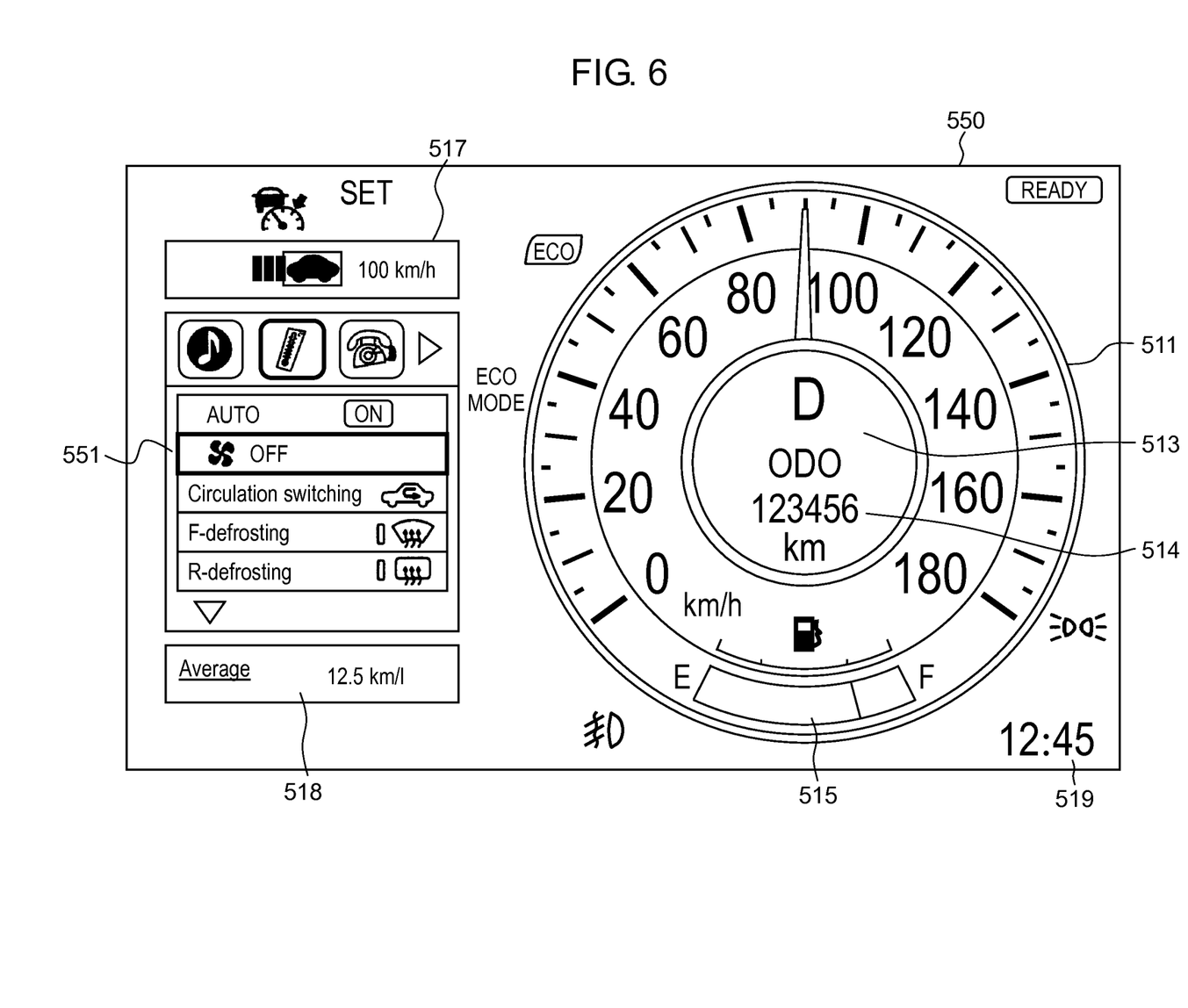
FIG. 6 is a view showing an example of a non-display mode display screen of a tachometer of the display control device according to this exemplary embodiment.

FIG. 6 is a view showing an example of a display screen 550 in the tachometer non-display mode.

As shown in FIG. 6, the display screen 550 in the tachometer non-display mode resembles the display screen 510 in the initial display mode, which is shown in FIG. 3; however, the display screen 550 does not display the tachometer 512 and automotive instrument status 516 which are shown in FIG. 3. Then, a highlight-requiring information 551 in an abbreviated version is displayed on a space made from a center left side to the left end portion as a result that such pieces of information have disappeared. Here, a case is shown, where the highlight-requiring information 551 is an operation menu (simplified version) of the automotive equipment.

That is to say, on the display screen 550 in tachometer non-display mode, the entire region of the speed meter 511 is displayed, while the tachometer 512 that has occupied a large space becomes non-displayed, and the highlight-requiring information is displayed. The respective pieces of the displayed information maintain the status close to those of the display layout of the display screen 510 of the initial display mode, which is shown in FIG. 3, as much as possible. In such a way, while maintaining the display of the entire region of the speed meter 511, and of other essential information in an easily visually recognizable form, display control device 400 can display the highlight-requiring information 551.

That is to say, in a case where the above-mentioned predetermined condition is not satisfied, and where the highlight-requiring information is not present, the initial display mode shown in FIG. 3 is selected. Moreover, in a case where the above-mentioned predetermined condition, for example, such a condition that the vehicle is traveling a substantially straight line at a low speed is not satisfied, and where the highlight-requiring information is present, then the tachometer non-display mode shown in FIG. 6 is selected. Moreover, in a case where the above-mentioned predetermined condition is satisfied, and the highlight-requiring information is present, then the speed meter half-display mode is selected.

Note that, though details will be described later, in a case where the highlight-requiring information is present, and where the vehicle is traveling at a high speed, the display control device 400 generates and displays an image in the display layout of the display screen 550 in the tachometer non-display mode as described above.

Note that, as mentioned above, the display layouts in these respective display modes are pre-stored in the display layout storage unit 440.

Moreover, when switching the display layout in the display control unit 450, for example, display control device 400 slides a display position of the information, continuously deforms a shape of the information, and performs fade-out/in for the information. In such a way, when the display layout is switched, the driver can easily grasp to which position the information has moved, and which information is subjected to the switching between the display and the non-display. In particular, since the speed meter 511 moves slidingly, the driver can surely recognize the presence of the speed meter 511 regardless of the half-display of the speed meter 511.

Moreover, when switching the display layout in the display control unit 450, desirably, as shown in FIG. 3 to FIG. 6, display control device 400 maintains the display shape and size of the speed meter 511 before and after the layout change. In such a way, the driver can surely grasp the display content of the speed meter 511.

Next, the operation of the display control device 400 is described.

Figure 7:
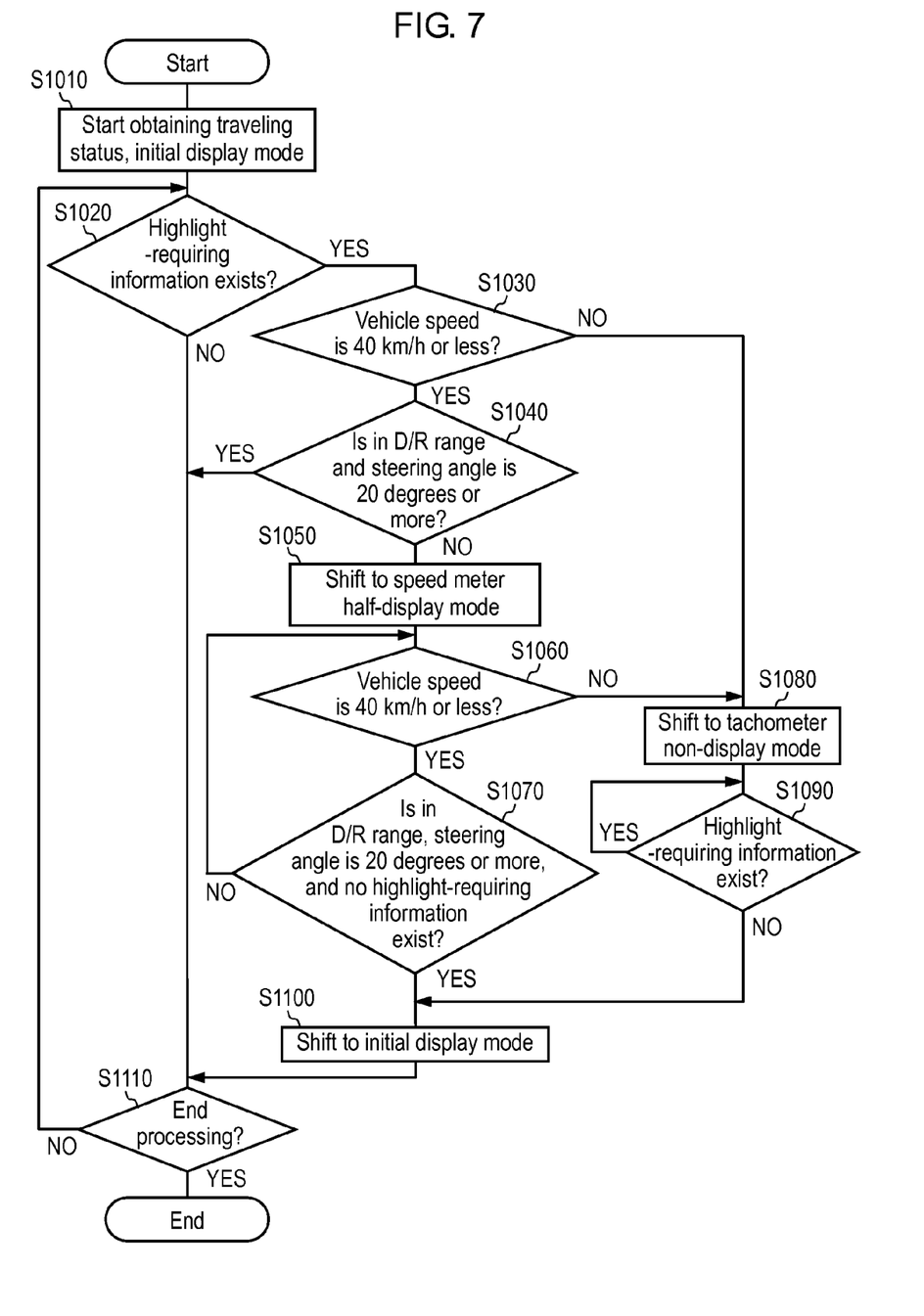
FIG. 7 is a flowchart showing an example of an operation of the display control device according to this exemplary embodiment.

FIG. 7 is a flowchart showing an example of the operation of the display control device 400. For example, each time when it is being activated, the display control device 400 starts the operation shown in FIG. 7. The respective automotive sensors and the respective pieces of the automotive equipment, which are shown in FIG. 2, are assumed to be activated when display control device 400 starts the operation shown in FIG. 7.

First, in Step S1010, the traveling status obtaining unit 420 starts to obtain the traveling status (speed, steering angle, presence of braking, and shift position). The display control unit 450 operates in the initial display mode, and displays, on display device 110, the screen (refer to the display screen 510 of FIG. 3) in the display layout in the initial display mode. The equipment control unit 410 sequentially determines whether or not the highlight-requiring information is present and controls such peripheral equipment based on the operation signal, the video signal and the status signal, which are input thereto.

Then, in Step S1020, the traveling status determining unit 430 determines whether or not the highlight-requiring information is present. That is to say, the traveling status determining unit 430 determines whether or not the additional information to be highlighted on the display device 110 is present.

The case where the highlight-requiring information is present is, for example, a case where the shift position is shifted to a reverse range, and in this case, the highlight-requiring information is a video of an area behind the vehicle taken by the periphery monitoring camera 310 (refer to the highlight-requiring information 531*a* of FIG. 4). Moreover, the case where the highlight-requiring information is present is a case where the display of the operation menu is instructed from the driver via steering switch unit 220, and in this case, the highlight-requiring information is the operation menu. For example, the equipment control unit 410 pre-stores information about a configuration of the operation menu. Note that the determination as to whether or not the highlight-requiring information is present is performed, for example, based on whether or not that the presence of the highlight-requiring information is issued from the equipment control unit 410.

In a case where the highlight-requiring information is present (Step S1020: YES), the traveling status determining unit 430 advances the processing to Step S1030. Moreover, in a case where the highlight-requiring information is not present (Step S1020: NO), the traveling status determining unit 430 advances the processing to Step S1110.

In Step S1030, the traveling status determining unit 430 determines whether or not the vehicle speed is 40 km/h or less. That is to say, the traveling status determining unit 430 determines whether or not the vehicle is traveling at a low speed or is stopped.

In a case where the vehicle speed is 40 km/h or less (S1030: YES), the traveling status determining unit 430 advances the processing to Step S1040. Moreover, in a case where the vehicle speed exceeds 40 km/h (Step S1030: NO), the traveling status determining unit 430 advances the processing to Step S1080 to be described later.

In Step S1040, the traveling status determining unit 430 determines whether or not the shift position is drive (D) or reverse (R), and the steering angle is 20 degrees or more. That is to say, the traveling status determining unit 430 determines whether or not the vehicle is traveling along a sharp curve.

In a case where the shift position is drive (D) or reverse (R), and where the steering angle is 20 degrees or more (Step S1040: YES), then the traveling status determining unit 430 advances the processing to Step S1110 to be described later. Moreover, in a case where the shift position is not drive (D) or reverse (R) (for example, is parking (P) or neutral (N)), or where the steering angle is less than 20 degrees (Step S1040: NO), then the traveling status determining unit 430 advances the processing to Step S1050.

That is to say, when the above-mentioned predetermined condition, which corresponds to at least a condition that the highlight-requiring information is present and that both of the display-requiring region and the display non-requiring region are present on the analog speed meter, is satisfied, then display control device 400 advances the processing to Step S1050. Note that, here, since the vehicle speed is as low as 40 km/h or less, the display-requiring region is the region corresponding to the low-speed range, and the display non-requiring region is the region corresponding to the high-speed range.

A reason why the region corresponding to the high-speed range is set to be the display non-requiring region at a time of the low speed is, for example, as follows. A maximum value of a speed change in an acceleration direction of the vehicle is small in comparison with a maximum value of a speed change in a deceleration direction of the vehicle, and it takes a certain time for the vehicle speed to be changed, for example, from 40 km/h to 70 km/h. Therefore, even if the analog speed meter is returned to the display of the entire region at a point of time when the speed reaches 40 km/h, it is possible for the driver to confirm the speed sufficiently.

In Step S1050, the display control unit 450 shifts to the speed meter half-display mode, and displays, on the display device 110, the screen (refer to FIG. 4 and FIG. 5) of the display layout in the speed meter half-display mode.

Then, in Step S1060, the traveling status determining unit 430 determines whether or not such a condition corresponding to Step S1030 is maintained. That is to say, the traveling status determining unit 430 determines whether or not the vehicle speed is maintained at 40 km/h or less, that is, whether or not the speed of the vehicle does not rise to the high-speed range.

In a case where the vehicle speed is maintained at 40 km/h or less (Step S1060: YES), the traveling status determining unit 430 advances the processing to Step S1070. Moreover, in the case where the vehicle speed exceeds 40 km/h (Step S1060: NO), the traveling status determining unit 430 advances the processing to Step S1080 to be described later.

That is to say, when a condition, which corresponds to at least the condition that the highlight-requiring information is present and that at least one of the display-requiring region and the display non-requiring region is present on the analog speed meter, is satisfied, then display control device 400 advances the processing to Step S1080. Note that, here, the vehicle speed is a high speed exceeding 40 km/h, and accordingly, the display-requiring region is the entire region.

A reason why the region corresponding to the low-speed range is not set to be the display non-requiring region at a time of the high speed is, for example, as follows. The maximum value of the speed change in the deceleration direction of the vehicle is large in comparison with the maximum value of the speed change in the acceleration direction of the vehicle, and in particular, at a time of emergency braking, the vehicle is suddenly decelerated in an extremely short time. Therefore, in terms of safety, it is preferable to also display the region, which corresponds to the low-speed range, even if the speed is high.

However, for example, in such a case where the maximum value of the speed change in the deceleration direction at the time of the emergency braking is suppressed sufficiently by an ABS (Antilock Brake System), the region corresponding to the low-speed range may be set to be the display non-requiring region at the time of the high speed.

In Step S1070, the traveling status determining unit 430 determines whether or not both of the condition corresponding to Step S1040 and the condition corresponding to Step S1020 are maintained. That is to say, the traveling status determining unit 430 determines whether or not at least one of the fact that the shift position is drive (D) or reverse (R) and the steering angle is 20 degrees or more and the fact that the highlight-requiring information is present is satisfied.

In a case where the shift position is drive (D) or reverse (R) and the highlight-requiring information is present, and where the steering angle is less than 20 degrees and the highlight-requiring information is present (Step S1070: NO), then the traveling status determining unit 430 returns the processing to Step S1060. Moreover, in a case where the shift position is drive (D) or reverse (R), and where the steering angle is 20 degrees or more, or a case where the highlight-requiring information is not present (Step S1070: NO), then the traveling status determining unit 430 advances the processing to Step S1100 to be described later.

In Step S1080, the display control unit 450 shifts to the tachometer non-display mode, and displays the screen (refer to FIG. 6) of the display layout in the tachometer non-display mode on display device 110.

Then, in Step S1090, the traveling status determining unit 430 determines whether or not the condition corresponding to Step S1020 is maintained. That is to say, the traveling status determining unit 430 determines whether or not the highlight-requiring information is still present.

In a case where the highlight-requiring information is present (Step S1090: YES), then the traveling status determining unit 430 returns the processing to Step S1080. Moreover, in a case where the highlight-requiring information is not present (Step S1090: NO), then the traveling status determining unit 430 advances the processing to Step S1100.

In Step S1100, the display control unit 450 shifts to the initial display mode, and displays the screen (refer to FIG. 3) of the display layout in the initial display mode on display device 110.

Then, in Step S1110, the traveling status determining unit 430 determines whether or not it is timing to end the processing. For example, the timing to end the processing is timing when the processing is instructed to end by the operation from the driver, and the like, and the timing when a predetermined time has elapsed in a status where the operation of the driver is not performed.

In a case of being not instructed to end the processing (Step S1110: NO), the traveling status determining unit 430 returns the processing to Step S1020. Moreover, in a case of being instructed to end the processing (Step S1110: YES), the traveling status determining unit 430 ends the series of processing.

By the operation as described above, the display control device 400 can sequentially determine whether or not the above-mentioned predetermined condition is satisfied, and can shift the display mode of the display device 110 at appropriate timing.

Note that, as it is obvious from Step S1040 and Step S1070, in a case where the vehicle is traveling at a steering angle of 20 degrees or more, display control device 400 prevents the display mode from shifting to the speed meter half-display mode. This allows the driver to concentrate on a driving operation, and to enhance the driving safety.

As described above, the display control device 400 according to this exemplary embodiment determines whether or not the predetermined condition, which corresponds to at least the condition that the highlight-requiring information is present and that at least one of the display-requiring region and the display non-requiring region is present on the analog speed meter, is satisfied. Then, when the predetermined condition is not satisfied, the display control device 400 displays the entire region of the analog speed meter on the display device 110, and when the predetermined condition is satisfied, the display control device 400 does not display the display non-requiring region of the analog speed meter on the display device 110.

Moreover, the display control device 400 does not display the display non-requiring region of the analog speed meter, thereby enlarges the display area of the highlight-requiring information on the display device 110, and displays the highlight-requiring information largely so that the highlight-requiring information can be easily visually recognizable.

Furthermore, when changing the display layout of the display device 110, the display control device 400 maintains the shape and arrangement of each piece of the information as much as possible.

In such a way, the display control device 400 can achieve the both of the ensuring of the driving safety and the enhancement of the convenience which is made by the presentation of the additional information.

Note that, in the exemplary embodiment described above, the predetermined condition for use in switching the display mode is set to be the condition where, when the speed is low, the region of the analog speed meter, which corresponds to the low-speed range, is set to be the display-requiring region, and the region of the analog speed meter, which corresponds to the high-speed range, is set to be the display non-requiring region; however, the present invention is not limited to this. For example, the predetermined condition may be set to be a condition where, when the speed is high, the region of the analog speed meter, which corresponds to the high-speed range, is set to be the display-requiring region, and the region of the analog speed meter, which corresponds to the low-speed range, is set to be the display non-requiring region.

Moreover, in the case where the above-described predetermined condition is not satisfied, the entire region of the analog speed meter is displayed; however, the present invention is not limited to this. For example, the display control device 400 may further determine whether or not another condition is satisfied, and a specific region of the analog speed meter may be set to be non-displayed.

Moreover, the analog speed meter does not necessarily have to be moved to the end portion of the display region. For example, in the case where the region of the analog speed meter, which corresponds to the low-speed range, is set to be the display non-requiring region, then the display control device 400 can directly use the region, which is set to be non-displayed, for the display of the highlight-requiring information.

A display control device of the present invention is a display control device that controls an indication status of a display device disposed in front of a driver's seat of a vehicle, the display control device including a traveling status obtaining unit that obtains a traveling status of a vehicle, which includes at least a speed of the vehicle. Moreover, the display control device of the present invention includes a traveling status determining unit that determines, based on the traveling status, whether or not a predetermined condition is satisfied, the predetermined condition corresponding to at least a condition that both of a first region to be displayed on the display device and a second region other than the first region are present on an analog speed meter that presents the speed. Furthermore, the display control device of the present invention includes a display control unit that does not display the second region of the analog speed meter on the display device when the predetermined condition is satisfied.

In the above-described display control device, when the speed is low, the first region may correspond to a low-speed range of the analog speed meter, and the second region may correspond to a high-speed range of the analog speed meter.

Moreover, in the above-described display control device, the traveling status further includes at least a shift position and a steering angle of the vehicle. Furthermore, the predetermined condition further corresponds to at least a condition that the speed of the vehicle is a first value or less, that the shift position is a drive position, and that the steering angle is a second value or less. The first region may include at least a region of the analog speed meter, which corresponds to the speed of the vehicle, the speed having the first value.

Moreover, in the above-described control device, when the speed of the vehicle is high, the first region may correspond to the high-speed range of the analog speed meter, and the second region may correspond to the low-speed range of the analog speed meter.

Moreover, in the above-described display control device, the predetermined condition further corresponds to at least a condition that the speed of the vehicle is a third value or more. The first region may include at least a region of the analog speed meter, which corresponds to the speed of the vehicle, the speed having the third value.

Moreover, in the above-described display control device, when the traveling status shifts to another status that satisfies the predetermined condition of the analog speed meter, the display control unit may move a display position of the analog speed meter in a display region of the display device from an initial position in which an entire region of the analog speed meter is included in the display region to an end position in which a display non-requiring region lies outside the display region.

Moreover, in the above-described display control device, the display control unit may slidingly move the display position of the analog speed meter from the initial position to the end position.

Furthermore, in the above-described display control device, the display control unit may display, in a region of the display region, in which the analog speed meter is not displayed, display object information which includes at least a shift position mark, an odometer, and a fuel gauge.

Moreover, in the above-described display control device, the predetermined condition further corresponds to at least a condition that information to be highlighted is present in the display object information. Then, the display control unit may highlight and display the information to be highlighted in the display region when the predetermined condition is satisfied.

A display control program of the present disclosure is a display control program for use in a display control device that controls an indication status of a display device disposed in front of a driver's seat of a vehicle, the display control program causing a computer of the display control device to execute processing of obtaining a traveling status of the vehicle, which includes at least a speed of the vehicle. Moreover, the display control program causes the computer to execute processing of determining, based on the traveling status, whether or not a predetermined condition is satisfied, the predetermined condition corresponding to at least a condition that both of a first region to be displayed on the display device and a second region other than the first region are present on an analog speed meter that presents the speed. Then, the display control program causes the computer to execute processing of displaying the first region of the analog speed meter on the display device, and not displaying the second region of the analog speed meter on the display device when such a predetermined condition is satisfied.

INDUSTRIAL APPLICABILITY

The present invention is useful as a display control device and a display control program, which are capable of achieving the both of the ensuring of the driving safety and the enhancement of the convenience which is made by the presentation of the additional information.

The invention claimed is:

1. A display control device that controls an indication status of a display device disposed in front of a driver's seat of a vehicle, the display control device comprising:
   a traveling status obtaining unit that obtains a traveling status of the vehicle, the traveling status including at least a speed of the vehicle;
   a traveling status determining unit that determines, based on the traveling status obtained by the traveling status obtaining unit, whether or not a predetermined condition is satisfied, the predetermined condition corresponding to at least a condition that both of a first region to be displayed on the display device and a second region other than the first region are present on an analog speed meter that presents the speed of the vehicle; and
   a display control unit that, when the traveling status shifts to another status that satisfies the predetermined condition of the analog speed meter, controls the indication status to move a display position of the analog speed meter in a display region of the display device from an initial position in which an entire region of the analog speed meter is included in the display region to an end position in which the second region lies outside the display region, and not to substantially change a size, shape and orientation of the first region,
   wherein, when the speed of the vehicle is low, the first region corresponds to a low-speed range of the analog speed meter and the second region corresponds to a high-speed range of the analog speed meter,
   wherein the traveling status further includes at least a shift position and a steering angle of the vehicle,
   wherein the predetermined condition further corresponds to at least a condition that the speed of the vehicle is a first value or less, the shift position is a drive position, and the steering angle is a second value or less, and
   wherein the first region includes at least a region corresponding to the speed of the vehicle having the first value in the analog speed meter.

2. The display control device according to claim 1, wherein when the speed of the vehicle is high, the first region corresponds to a high-speed range of the analog speed meter, and the second region corresponds to a low-speed range of the analog speed meter.

3. The display control device according to claim 2, wherein
   the predetermined condition further corresponds to at least a condition that the speed of the vehicle is a third value or more, and
   the first region includes at least a region corresponding to the speed having the third value in the analog speed meter.

4. The display control device according to claim 1, wherein the display control unit slidingly moves the display position of the analog speed meter from the initial position to the end position.

5. The display control device according to claim 1, wherein the display control unit displays, in a region of the display region, in which the analog speed meter is not displayed, display object information which includes at least a shift position mark, an odometer and a fuel gauge.

6. The display control device according to claim 4, wherein
   the predetermined condition further corresponds to at least a condition that information to be highlighted is present in the display object information, and
   the display control unit highlights and displays the information to be highlighted in the display region when the predetermined condition is satisfied.

7. A display control method for use in a display control device that controls an indication status of a display device disposed in front of a driver's seat of a vehicle, the method comprising:
   obtaining a traveling status of the vehicle, the traveling status including at least a speed of the vehicle;
   determining, based on the traveling status, whether or not a predetermined condition is satisfied, the predetermined condition corresponding to at least a condition that both of a first region to be displayed on the display device and a second region other than the first region are present on an analog speed meter that presents the speed; and
   when the traveling status shifts to another status that satisfies the predetermined condition of the analog speed meter, controlling the indication status to move a display position of the analog speed meter in a display region of the display device from an initial position in which an entire region of the analog speed meter is included in the display region to an end position in which the second region lies outside the display region, and not to substantially change a size, shape and orientation of the first region,
   wherein, when the speed of the vehicle is low, the first region corresponds to a low-speed range of the analog speed meter and the second region corresponds to a high-speed range of the analog speed meter,
   wherein the traveling status further includes at least a shift position and a steering angle of the vehicle, wherein the predetermined condition further corresponds to at least a condition that the speed of the vehicle is a first value or less, the shift position is a drive position, and the steering angle is a second value or less, and wherein the first region includes at least a region corresponding to the speed of the vehicle having the first value in the analog speed meter.

8. A display control program embodied on a non-transitory computer readable medium for use in a display control device to cause a computer to control an indication status of a display device disposed in front of a driver's seat of a vehicle, the display control program causing the computer of the display control device to perform:

obtaining a traveling status of the vehicle, the traveling status including at least a speed of the vehicle;

determining, based on the traveling status, whether or not a predetermined condition is satisfied, the predetermined condition corresponding to at least a condition that both of a first region to be displayed on the display device and a second region other than the first region are present on an analog speed meter that presents the speed; and when the traveling status shifts to another status that satisfies the predetermined condition of the analog speed meter, controlling the indication status to move a display position of the analog speed meter in a display region of the display device from an initial position in which an entire region of the analog speed meter is included in the display region to an end position in which the second region lies outside the display region, and not to substantially change a size, shape and orientation of the first region, wherein, when the speed of the vehicle is low, the first region corresponds to a low-speed range of the analog speed meter and the second region corresponds to a high-speed range of the analog speed meter, wherein the traveling status further includes at least a shift position and a steering angle of the vehicle, wherein the predetermined condition further corresponds to at least a condition that the speed of the vehicle is a first value or less, the shift position is a drive position, and the steering angle is a second value or less, and wherein the first region includes at least a region corresponding to the speed of the vehicle having the first value in the analog speed meter.

9. A display control device that controls an indication status of a display device disposed in front of a driver's seat of a vehicle, the display control device comprising:

a traveling status obtaining unit that obtains a traveling status of the vehicle, the traveling status including at least a speed of the vehicle;

a traveling status determining unit that determines, based on the traveling status obtained by the traveling status obtaining unit, whether or not a predetermined condition is satisfied, the predetermined condition corresponding to at least a condition that both of a first region to be displayed on the display device and a second region other than the first region are present on an analog speed meter that presents the speed of the vehicle; and a display control unit that, when the traveling status shifts to another status that satisfies the predetermined condition of the analog speed meter, controls the indication status to move a display position of the analog speed meter in a display region of the display device from an initial position in which an entire region of the analog speed meter is included in the display region to an end position in which the second region lies outside the display region, and not to substantially change a size, shape and orientation of the first region, wherein the display control unit displays, in a region of the display region, in which the analog speed meter is not displayed, display object information which includes at least a shift position mark, an odometer and a fuel gauge, wherein the predetermined condition further corresponds to at least a condition that information to be highlighted is present in the display object information, and wherein the display control unit highlights and displays the information to be highlighted in the display region when the predetermined condition is satisfied.

* * * * *